United States Patent
Seidel et al.

(10) Patent No.: US 8,208,873 B2
(45) Date of Patent: Jun. 26, 2012

(54) METHOD AND APPARATUS FOR ADJUSTING WAVEFORM PARAMETERS FOR AN ADAPTIVE AIR INTERFACE WAVEFORM

(75) Inventors: Scott Y. Seidel, Fairfax, VA (US); Jay N. Livingston, Oakton, VA (US); Robert J. Breinig, Warrenton, VA (US); Bernd-Peter Paris, McLean, VA (US); Michael R. Franceschini, Centerport, NY (US)

(73) Assignee: Powerwave Cognition, Inc., Santa Ana, CA (US)

( * ) Notice: Subject to any disclaimer, the term of this patent is extended or adjusted under 35 U.S.C. 154(b) by 440 days.

(21) Appl. No.: 11/595,717

(22) Filed: Nov. 10, 2006

(65) Prior Publication Data

US 2008/0113624 A1    May 15, 2008

(51) Int. Cl.
*H01Q 11/12* (2006.01)
*H04L 12/66* (2006.01)
*H04B 1/00* (2006.01)
*H04B 15/00* (2006.01)

(52) U.S. Cl. ......... 455/126; 370/352; 375/146; 375/285
(58) Field of Classification Search ............... 455/67.13, 455/107
See application file for complete search history.

(56) References Cited

U.S. PATENT DOCUMENTS

| | | | |
|---|---|---|---|
| 5,742,593 A * | 4/1998 | Sharony et al. | 370/330 |
| 5,748,147 A * | 5/1998 | Bickley et al. | 342/457 |
| 6,084,919 A | 7/2000 | Kleider et al. | |
| 6,330,278 B1 | 12/2001 | Masters et al. | 375/223 |
| 6,385,434 B1 | 5/2002 | Chuprun et al. | |
| 6,847,678 B2 | 1/2005 | Berezdivin et al. | 375/146 |
| 6,985,737 B2 | 1/2006 | Yamaguchi et al. | |
| 7,239,624 B2 | 7/2007 | Buchwald et al. | |
| 7,787,426 B2 | 8/2010 | Seidel et al. | |
| 8,019,018 B2 | 9/2011 | Cormier et al. | |
| 2002/0012337 A1 | 1/2002 | Schmidl et al. | |
| 2003/0050012 A1 | 3/2003 | Black et al. | |
| 2003/0174759 A1 * | 9/2003 | Miyoshi | 375/146 |
| 2003/0198200 A1 | 10/2003 | Diener et al. | |
| 2003/0203721 A1 * | 10/2003 | Berezdivin et al. | 455/126 |
| 2003/0203735 A1 | 10/2003 | Andrus et al. | |
| 2003/0206561 A1 | 11/2003 | Schmidl et al. | |
| 2003/0210680 A1 * | 11/2003 | Rao et al. | 370/352 |

(Continued)

FOREIGN PATENT DOCUMENTS

EP    1178625    2/2002

(Continued)

OTHER PUBLICATIONS

Seidel, Scott, "*IEEE 802 Tutorial: Cognitive Radio*", 21 pages, Jul. 18, 2005.

(Continued)

*Primary Examiner* — Yuwen Pan
*Assistant Examiner* — Ayodeji Ayotunde
(74) *Attorney, Agent, or Firm* — Strategic Patents, P.C.

(57) ABSTRACT

Adjusting parameters of a waveform includes facilitating wireless communication between a transmitting node and receiving nodes, where the transmitting node communicates with a receiving node over a channel. Spectrum conditions are estimated, where a spectrum condition describes spectrum utilization in the vicinity of surrounding nodes. Channel conditions are estimated, where a channel condition describes a channel of the plurality of channels. Waveform parameters are adjusted in response to the spectrum conditions and the channel conditions.

27 Claims, 3 Drawing Sheets

U.S. PATENT DOCUMENTS

| | | |
|---|---|---|
| 2004/0032847 A1 | 2/2004 | Cain |
| 2004/0047324 A1 | 3/2004 | Diener |
| 2004/0058679 A1 | 3/2004 | Dillinger et al. |
| 2004/0085912 A1 | 5/2004 | Xu et al. |
| 2004/0092281 A1 | 5/2004 | Burchfiel |
| 2004/0110493 A1* | 6/2004 | Alvarez et al. ............. 455/414.1 |
| 2004/0132496 A1 | 7/2004 | Kim et al. |
| 2004/0172476 A1 | 9/2004 | Chapweske |
| 2004/0220995 A1 | 11/2004 | Tsutsumi |
| 2004/0259503 A1 | 12/2004 | Ogura |
| 2005/0020293 A1 | 1/2005 | Moore |
| 2005/0031047 A1* | 2/2005 | Maltsev et al. ............... 375/260 |
| 2005/0053032 A1 | 3/2005 | Itoh |
| 2005/0070294 A1 | 3/2005 | Lyle et al. |
| 2005/0083876 A1 | 4/2005 | Vialen et al. |
| 2005/0099957 A1* | 5/2005 | Soldani et al. ................ 370/252 |
| 2005/0128998 A1 | 6/2005 | Jelitto et al. |
| 2005/0157678 A1 | 7/2005 | Mantha et al. |
| 2005/0197118 A1 | 9/2005 | Mitchell |
| 2005/0259724 A1 | 11/2005 | Bergstrom et al. |
| 2005/0276317 A1 | 12/2005 | Jeong et al. |
| 2006/0035641 A1 | 2/2006 | Moon et al. |
| 2006/0084444 A1 | 4/2006 | Kossi et al. |
| 2006/0088010 A1 | 4/2006 | Buchwald et al. |
| 2006/0126847 A1 | 6/2006 | Ho |
| 2006/0142033 A1 | 6/2006 | Wolman et al. |
| 2006/0146745 A1 | 7/2006 | Cai et al. |
| 2006/0171332 A1 | 8/2006 | Barnum |
| 2006/0198346 A1 | 9/2006 | Liu et al. |
| 2006/0209762 A1 | 9/2006 | Talmola et al. |
| 2006/0215605 A1 | 9/2006 | Srikrishna et al. |
| 2006/0215611 A1 | 9/2006 | Nakagawa et al. |
| 2006/0251019 A1 | 11/2006 | Dalsgaard et al. |
| 2006/0268791 A1 | 11/2006 | Cheng et al. |
| 2006/0268792 A1 | 11/2006 | Belcea |
| 2006/0289650 A1 | 12/2006 | Taylor et al. |
| 2007/0129011 A1 | 6/2007 | Lal et al. |
| 2007/0142067 A1 | 6/2007 | Cheng et al. |
| 2007/0211686 A1 | 9/2007 | Belcea et al. |
| 2007/0237092 A1 | 10/2007 | Balachandran et al. |
| 2007/0249341 A1 | 10/2007 | Chu et al. |
| 2008/0095102 A1 | 4/2008 | Meng et al. |
| 2008/0108358 A1 | 5/2008 | Patel et al. |
| 2009/0298442 A1 | 12/2009 | Adkins |

FOREIGN PATENT DOCUMENTS

| | | |
|---|---|---|
| EP | 1178625 A2 | 2/2002 |
| EP | 1585246 A2 | 10/2005 |
| EP | 1667372 | 6/2006 |
| JP | 2003046595 | 2/2003 |
| JP | 2003046595 A2 | 2/2003 |
| WO | WO-9939472 A1 | 8/1999 |
| WO | WO-2006/039800 A1 | 4/2006 |
| WO | WO-2008/121161 | 10/2008 |
| WO | WO-2008/127420 | 10/2008 |
| WO | WO-2008/127421 | 10/2008 |
| WO | WO-2008/140566 A2 | 11/2008 |
| WO | WO-2008/140566 A3 | 11/2008 |
| WO | WO-2008/140566 A9 | 11/2008 |
| WO | WO-2008/143695 A2 | 11/2008 |
| WO | WO-2008/147447 A2 | 12/2008 |
| WO | WO-2008/156498 A2 | 12/2008 |
| WO | WO-2008/156498 A3 | 12/2008 |
| WO | WO-2008/127421 A3 | 3/2009 |
| WO | WO-2008/147447 A3 | 2/2010 |
| WO | WO-2008/121161 A3 | 3/2010 |
| WO | WO-2008/143695 A3 | 3/2010 |

OTHER PUBLICATIONS

Pending U.S. Appl. No. 11/595,719 entitled, "*Autonomous Dynamic Spectrum Access*", 38 pages. specification, claims and abstract, 16 pages of drawings, inventors Scott Y. Seidel, et al., filed Nov. 10, 2006.

Pending U.S. Appl. No. 11/595,542 entitled, "*Method and System for Using Selected Bearer Channels*", 31 pages specification, claims and abstract, 4 pages of drawings, inventors Scott Y. Seidel, et al., filed Nov. 10, 2006.

Pending U.S. Appl. No. 11/595,740 entitled, "*Adaptive Control Channel Initialization Operations for Autonomous Dynamic Spectrum Access Systems*", 39 pages specification, claims and abstract, 16 pages of drawings, inventors Scott Y. Seidel, et al., filed Nov. 10, 2006.

Pending U.S. Appl. No. 11/595,716 entitled, "*Scheduling for Autonomous Dynamic Spectrum Access Systems*", 40 pages specification, claims and abstract, 16 pages of drawings, inventor Scott Y. Seidel, filed Nov. 10, 2006.

Pending U.S. Appl. No. 11/595,493 entitled, "*Bearer Selection and Negotiation in Autonomous Dynamic Spectrum Access Systems*", 39 pages specification, claims and abstract, 16 pages of drawings, inventors Scott Y. Seidel, et al., filed Nov. 10, 2006.

Pending U.S. Appl. No. 11/595,718 entitled, "*Interference Avoidance for Autonomous Dynamic Spectrum Access Systems*", 39 pages specification, claims and abstract, 16 pages of drawings, inventors Scott Y. Seidel, et al., filed Nov. 10, 2006.

"U.S. Appl. No. 11/595,493, Non-Final Office Action mailed Dec. 29, 2009".

"U.S. Appl. No. 11/595,719, Final Office Action mailed Jun. 19, 2009".

"U.S. Appl. No. 11/595,740,Non Final Office Action mailed Nov. 23, 2009".

"U.S. Appl. No. 11/595,716, Final Office Action mailed Nov. 2, 2009".

"International Application Serial No. PCT/US2007/084371, Search Report and Written Opinion mailed Dec. 16, 2009".

"International Application Serial No. PCT/US2007/084372, Search Report and Written Opinion mailed Dec. 16, 2009".

"International Application Serial No. PCT/US2007/084376, Search Report and Written Opinion mailed Dec. 22, 2009", , 12 pgs.

"International Search Report", *ISR sent on* Jun. 20, 2008 for PCT Application No. PCTUS2007021640.

"U.S. Appl. No. 11/595,719, NFOA, mailed Mar. 2, 2009", , all.

"U.S. Appl. No. 11/595/716, NFOA, mailed Mar. 3, 2009", , all.

Akyildiz, I F. et al., "NeXt generation/dynamic spectrum access/cognitive radio wireless networks: A Survey", *Computer Networks* vol. 50. from ISR/WO of Nov. 20, 2009 May 17, 2006 , 2127-2159.

Bao, Lichun et al., "Channel Access Scheduling in Ad Hoc Networks with Unidirectional Links", *Computer Science Dept. and Computer Engineering Dept.*, University of CA, 2001 2001 , 1-10.

Bao, Lichun et al., "Hybrid Channel Access Scheduling in Ad Hoc Networks", *Computer Science Dept. and Compuiter Engineering Dept.*, University of CA, ,2002 , 1-12.

Dimou, K. et al., "Generic Link Layer: A Solution for Multi-Radio Transmission Diversity in Communication Networks beyond 3G", *2005 62nd Vehicular Technology Conference* Sep. 25-28, 2005 , 1672-1676.

ISR, , "International Search Report", PCT/US07/84374 Dec. 8, 2008 , all.

ISR, ,"PCT/US2007/084370", Mar. 13, 2009.

ISR, ,"PCT/US2007/084375", PCT Search Report Jan. 22, 2009 , all.

Jorgenson, M. et al., "Operation of the dynamic TDMA subnet relay system with HF bearers", *2005 IEEE Military Communications Conference*, vol. 1 Oct. 17-20, 2005 , 338-343.

Seidel, S. et al., "Autonomous dynamic spectrum access system behavior and performance", *In DySPAN 2005; First IEEE Symposium on new Frontiers in Dynamic Spectrum Access Networks* Nov. 2005 , 180-183.

Zhao, J et al., ""Distributed coordination in dynamic spectrum allocation networks"", *Proc. IEEE DySPAN 2005* Nov. 2005, 259-268.

"U.S. Appl. No. 11/548,763, Non-Final Office Action mailed Mar. 23, 2010", , 19.

"U.S. Appl. No. 11/595,719, Non-Final Office Action Jan. 27, 2010", , 29 Pgs.

"U.S. Appl. No. 11/595,493, Final Office Action mailed Jul. 16, 2010", , 22.

"Application U.S. Appl. No. 11/595,740, Notice of Allowance mailed Apr. 15, 2010", , 16.

"U.S. Appl. No. 11/595,719, Final Office Action mailed May 14, 2010", , 5.

"U.S. Appl. No. 11/548,763, Non-Final Office Action mailed Nov. 18, 2010", , 12.

"U.S. Appl. No. 11/595,716, Non-Final Office Action mailed Jan. 6, 2011",, 23.

"Application Serial No. 111595,719, Non-Final Office Action mailed Feb. 25, 2011",, 32.

"U.S. Appl. No. 11/595,493, Final Office Action mailed Feb. 2, 2011",, 17.

"U.S. Appl. No. 11/595,542, Non-Final Office Action mailed Oct. 4, 2010",, 20 pgs.

"U.S. Appl. No. 11/595,719, Non-Final Office Action mailed Sep. 2, 2010",, 3.

"U.S. Appl. No. 11/595,493, Non-Final Office Action mailed Sep. 22, 2010",, 17.

Seidel, S. et al., ""Autonomous dynamicspectrum access system behavior andperformance"", 2005 1st IEEE International Symposium on New Frontiers in Dynamic Spectrum Access Networks, Baltimore, MD, USA, Nov. 8, 2005, 180-183.

Zhi Tian, et al., "A Wavelet Approach to Wideband Spectrum Sensing for Cognitive Radios", In: IEEE Cognitive Radio.Oriented Wireless Networks and Communicat i ons Jun. 8, 2006.

Cai Li, Guo et al., "Investigation on Spectrum Sharing Technology Based on Cogni t i ve Radi o", In: IEEE ChinaCom'06 First International Conference on Comm. and Networking Oct. 25, 2006.

Lehtmiaki, Janne J. et al., "Spectrum Sensing with Forward Methods", In: IEEE MILCOM 2006, Oct. 23, 2006.

Scott, D. et al., ""IEEE 802 Tutorial: 1-15 Cognitive Radio",", IEEE, Piscataway, NJ, USA, [Online] URL :http://www.ieee802 .org/802_tutorials/05-July/IEEE%20802%20CR%20Tutorial%207-18-05%20seidel%20input.pdf scott seidel raytheon tutorial Jul. 18, 2005, 1-21.

"U.S. Appl. No. 11/548,763, Notice of Allowance mailed May 11, 2011",, 14.

"U.S. Appl. No. 11/595,493, Notice of Allowance mailed Jun. 3, 2011",, 7.

"U.S. Appl. No. 11/595,719, Notice of Allowance mailed Apr. 21, 2011",, 5.

"U.S. Appl. No. 11/595,542, Final Office Action mailed May 12, 2011",, 15.

"U.S. Appl. No. 11/595,716, Final Office Action mailed Jun. 9, 2011",, 17.

"International Application Serial No. PCT/US2007/084373, Search Report and Written Opinion mailed Apr. 14, 2011",, 9.

Akyildiz, I F. et al., "Next generation/dynamic spectrum access/cognitive radio wireless networks: A survey", Computer Networks, Elsevier Science Publishers B.V., Amsterdam, NL ,vol. 50, No. 13, Sep. 15, 2006, 2127-2159.

Ganesan, G et al., "Cooperative spectrum sensing in cognitive radio networks", 2005 1st IEEE International Symposium on New Frontiers in Dynamic Spectrum Access Networks, Baltimore, MD , USA, Nov. 8, 2005, 137-143.

"European Search Report, Appl No. 07875104.7", Oct. 11, 2011, 1-9.

"U.S. Appl. No. 11/595,542, Non-Final Office Action mailed Oct. 4, 2011",, 17.

"EP appln No. 07875063.5; EP Search Report dated Apr. 2, 2012".

* cited by examiner

METHOD AND APPARATUS FOR ADJUSTING WAVEFORM PARAMETERS FOR AN ADAPTIVE AIR INTERFACE WAVEFORM

GOVERNMENT FUNDING

The U.S. Government may have certain rights in this invention as provided for by the terms of Contract No. F30602-03-C-0079 awarded by the United States Air Force Research Laboratory as agent for the Defense Advanced Research Projects Agency (DARPA).

TECHNICAL FIELD

This invention relates generally to the field of wireless communications and more specifically to a method and apparatus for adjusting waveform parameters for an adaptive air interface waveform.

BACKGROUND

Nodes of wireless communication systems communicate using signals. Waveform parameters of the signals may be adjusted to adapt to changing conditions of the communication systems, which are becoming increasingly frequency-agile. According to known techniques, waveform parameters, such as equalization or adaptive data rate parameters, may be adjusted to respond to link conditions. These techniques, however, are not suitable in certain situations. The techniques are limited in their ability to adapt in center frequency and occupied bandwidth, and fail to adapt to changing spectrum occupancy conditions. Moreover, the techniques fail to reduce interference for surrounding nodes.

SUMMARY OF THE DISCLOSURE

In accordance with the present invention, disadvantages and problems associated with previous techniques for adjusting waveform parameters may be reduced or eliminated.

According to one embodiment of the present invention, adjusting parameters of a waveform includes facilitating wireless communication between a transmitting node and receiving nodes, where the transmitting node communicates with a receiving node over a channel. Spectrum conditions are estimated, where a spectrum condition describes spectrum utilization in the geographic vicinity surrounding the transmitting node and one or more receiving nodes. Channel conditions are estimated, where a channel condition describes both a single channel between a pair of nodes and a plurality of channels between a transmitting node and multiple receiving nodes. Waveform parameters are adjusted in response to the spectrum conditions and the channel conditions.

Certain embodiments of the invention may provide one or more technical advantages. A technical advantage of one embodiment may be that waveform parameters may be adjusted in response to channel conditions. Adjusting the waveform parameters in response to channel conditions may yield a waveform that improves link performance and reduces interference to and from surrounding nodes. Another technical advantage of one embodiment may be that waveform parameters may be adjusted in response to spectrum conditions in addition to channel conditions. Adjusting the waveform parameters in response to spectrum conditions may yield a waveform that improves link performance and reduces interference to and from surrounding nodes.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figures 1, 4:
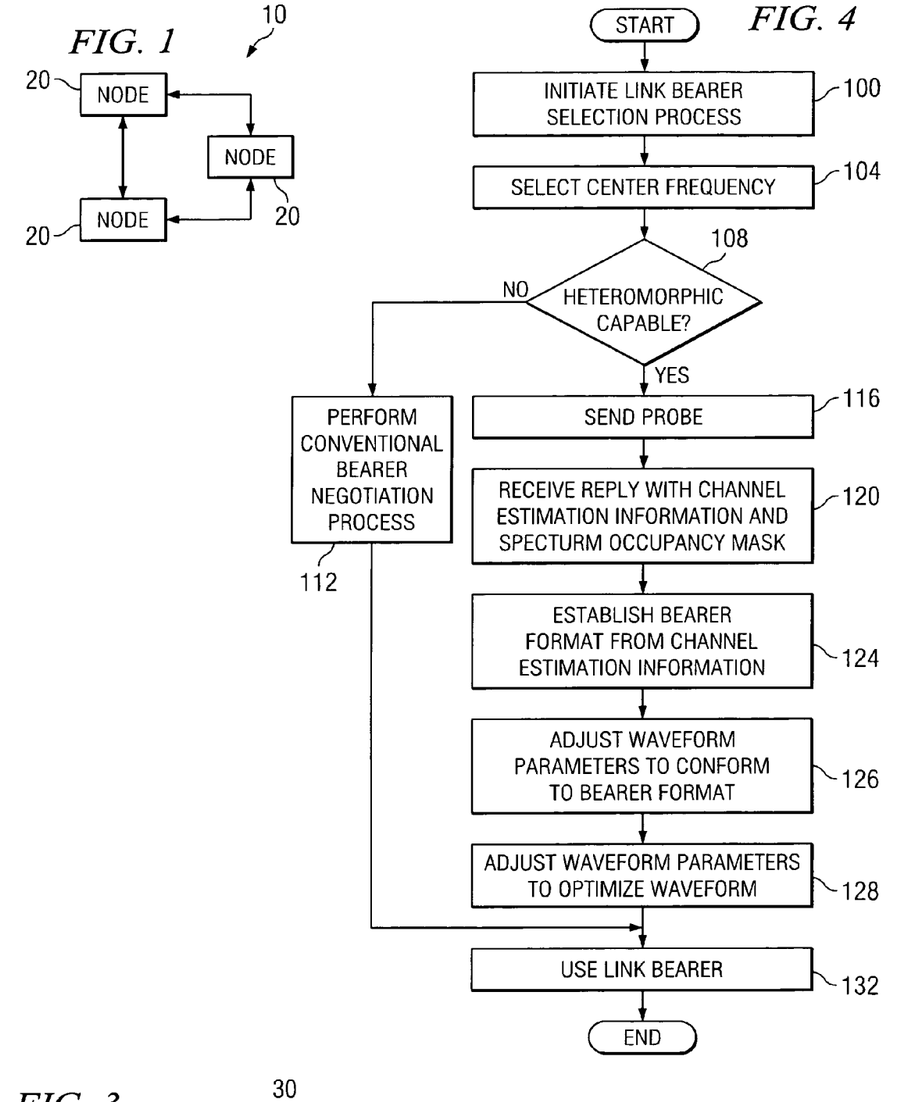
FIG. 1 is a diagram illustrating one embodiment of a network of nodes that may adjust waveform parameters in response to dynamic spectrum and channel conditions.
FIG. 4 is a flowchart illustrating one embodiment of a method for adjusting waveform parameters in response to dynamic spectrum and channel conditions.

FIG. 1 is a diagram illustrating one embodiment of a network 10 of nodes 20 that may adjust waveform parameters in response to dynamic spectrum and channel conditions. According to the embodiment, a transmitting node 20 may send a probe signal to a receiving node 20, which may reply with channel estimation information derived from the received probe signal. Transmitting node 20 establishes waveform parameters from the channel estimation information and externally provided spectrum conditions, and adjusts waveform parameters in response to the conditions.

According to the illustrated embodiment, network 10 includes nodes 20. A node 20 represents any suitable device operable to communicate with another node 20. In general, a device may include any suitable arrangement of components operable to perform the operations of the device, and may comprise logic. "Logic" may refer to hardware, software, or a combination of hardware and software. Node 20 may comprise, for example, a personal digital assistant, a computer such as a laptop, a cellular telephone, a mobile handset, or any other device operable to communicate with another node 20.

Nodes 20 communicate using signals. A signal may be composed using orthogonal frequency division multiplexing (OFDM) techniques with any suitable number of tones and any suitable bandwidth. For example, the signal may have 1,024 tones in a 25.6 megahertz (MHz) bandwidth. A signal may be configured into one or more sub-carriers that are dynamically placed over a span of, for example, up to 250 MHz. Multiple sub-carriers may be aggregated to form a sub-band of any suitable width. A sub-carrier may be independently modulated by any suitable technique, for example, a direct sequence spread-spectrum (DSSS) technique.

Signals communicate information. Information may include voice, data, text, audio, video, multimedia, control, signaling, other information, or any combination of the preceding. The information may be communicated in packets. A packet may comprise a bundle of data organized in a specific way for transmission, and a frame may comprise the payload of one or more packets organized in a specific way for transmission.

Transmitting node 20 may send a probe signal to receiving node 20. "Probe signal" refers to a signal that may be used to obtain channel estimation information. Channel estimation information may be used to estimate the coherence time and coherence bandwidth of a channel. The coherence bandwidth of a channel refers to the approximate maximum bandwidth over which two frequencies of a signal are likely to experience comparable or correlated amplitude fading, which results from multipath fading of the channel. The coherence bandwidth may be used to adjust the frequency and width of a subcarrier. The coherence time of a channel refers to the approximate maximum time period during which a signal remains coherent, and corresponds to the rate of change of the fading due to the relative motion between nodes. The coherence time may provide a measure of how long channel estimates remain valid.

According to one embodiment, a probe signal may comprise a preamble, a channel estimation sequence, identification data, other information, or any combination of the preceding. The preamble may be used for timing recovery and signal detection, and may be correlated at the receiving node 20 in the time domain. The preamble may yield any suitable size of overhead for the probe signal. For example, if the probe signal size is 128 fast Fourier transform (FFT) blocks, the preamble may result in 0.8%, 3%, or 6% overhead for lengths of 1, 4, or 8 FFT blocks, respectively. The channel estimation sequence may be used to estimate the coherence time and coherence bandwidth, and may span the full channel bandwidth. The identification data may include a transmitting node identifier and a receiving node identifier. The probe signal may be excised in the frequency domain to account for spectrum conditions, which may reduce the likelihood of preamble detection.

Transmitting node 20 may send the probe signal on a designated frequency. In response to the probe signal, receiving node 20 may send a reply message with channel estimation information, such as the results of a coherence time and coherence bandwidth analysis. The reply message may also include a local occupancy mask, which may be used to increase the likelihood of detection of the preamble of the probe signal at low signal-to-noise ratio.

Figure 2:
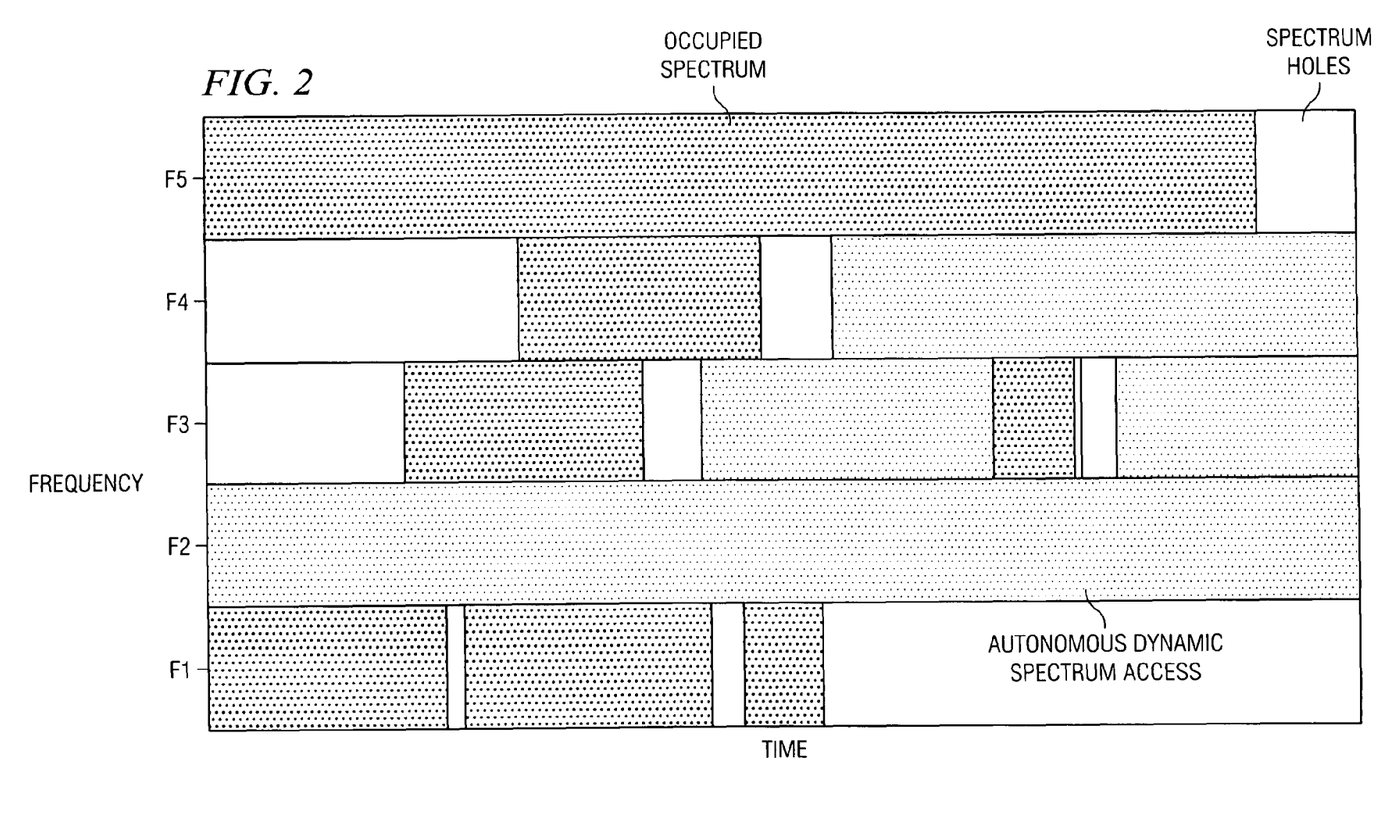
FIG. 2 is a diagram illustrating an example of one method of autonomous dynamic spectrum access using an adaptive air interface waveform with adjustable parameters.

Transmitting node 20 establishes dynamic spectrum and channel conditions from the spectrum estimation and channel estimation information. Spectrum conditions may describe spectrum utilization. Spectrum utilization may be expressed as the utilization of spectrum in the time, frequency, and space dimensions. FIG. 2 is a diagram illustrating an example of one method of autonomous dynamic spectrum access that uses an adaptive air interface waveform in an instance of spectrum conditions. A "hole" may refer to a region in time, frequency, and space where spectrum is not being utilized. Channel conditions may describe the quality of communication over a channel.

In FIG. 1, transmitting node 20 adjusts waveform parameters in response to the conditions of FIG. 2. Waveform parameters may be adjusted such that sub-carriers utilize holes in the spectrum. Waveform parameters may also be adjusted such that the parameters provide sufficient performance for the channel conditions. "Waveform parameter" may refer to a parameter that describes any suitable aspect of processing a waveform of a signal. Example waveform parameters include center frequency, occupied bandwidth profile, coding, or modulation parameters.

Center frequency and occupied bandwidth parameters may include parameters that describe aspects of how a signal utilizes the spectrum. As a first example, as shown in FIG. 2, the center frequency or bandwidth or both center frequency and bandwidth of a waveform may be selected to move a signal to a particular frequency. As a second example, sub-carriers of a signal may be organized to move the sub-carriers to a particular frequency. As a third example, the power of each sub-carrier may be selected to optimize utilization of the sub-carriers. As a fourth example, data may be mapped to a combination of sub-carriers to allow for system gain. Spreading gain and frequency diversity gain may be applied across adjacent sub-carriers. Interference averaging may be achieved by mapping data across non-contiguous sub-carriers.

Coding parameters may include parameters that describe aspects of coding a signal using a code such as a chip sequence. As a first example, the code rate may be selected to match code strength to channel conditions. A lower code rate may extend the link margin, and a higher code rate may deliver a higher data rate using a sufficient amount of coding gain. As a second example, the code length may be selected to map user data into a sub-carrier capacity. A longer code may be used to seize longer/larger temporal holes in spectrum, and a shorter code may be used to seize shorter/smaller temporal holes. A shorter code may also be used to meet low latency requirements and provide for fast adaptation. As a third example, multi-level coding may be used to simplify the coding and decoding architecture. Multi-level coding may support adaptive coding strategies by pre-filling multiple user data blocks for immediate transmission.

Modulation parameters may include parameters that describe aspects of modulating a signal for transmission. As a first example, a modulation scheme, such as an orthogonal frequency division multiplexing (OFDM) technique or a direct sequence spread-spectrum (DSSS) technique, may be selected. As a second example, a modulation constellation may be modified to trade-off raw data rate for power efficiency. A smaller modulation constellation may provide for operation at lower receive power levels to extend coverage range, and a larger modulation constellation may provide for larger raw capacity.

According to one embodiment, the waveform parameters may be rapidly modified such that one, some, or all sub-carriers of a channel may be quickly relinquished, for example, within the time frame of a burst. The sub-carriers may be relinquished in response to detection of other signals in the channel. As an example, a quickly reacting power control may provide for rapid modification to avoid mutual interference with nearby spectrum users.

In FIG. 1, a component of network 10 may include logic, an interface, memory, other component, or any suitable combination of the preceding. Certain logic may manage the operation of a device, and may comprise, for example, a processor. "Processor" may refer to any suitable device operable to execute instructions and manipulate data to perform operations. "Interface" may refer to logic of a device operable to receive input for the device, send output from the device, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to network 10 without departing from the scope of the invention. The components of network 10 may be integrated or separated according to particular needs. Moreover, the operations of network 10 may be performed by more, fewer, or other modules. Additionally, operations of network 10 may be performed using any suitable logic.

Figure 3:
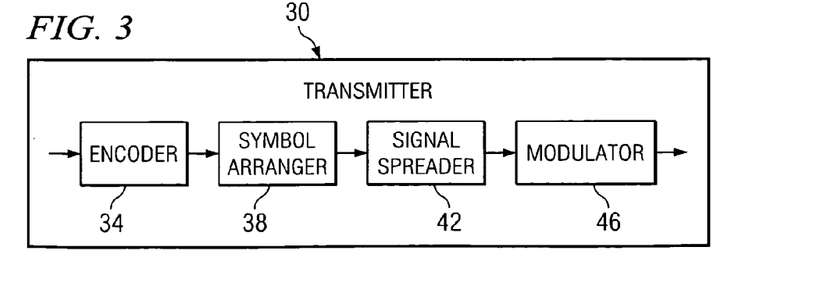
FIG. 3 is a block diagram illustrating one embodiment of a transmitter of a node that may be used to adjust waveform parameters.

FIG. 3 is a block diagram illustrating one embodiment of a transmitter 30 of a node 20 that may be used to adjust waveform parameters. According to the illustrated embodiment, transmitter 30 includes an encoder 34, an interleaver 38, a signal spreader 42, and a modulator 46 coupled as shown. Transmitter 30 may be used to adjust the waveform parameters of a signal.

Encoder 34 encodes data to yield codewords in order to provide forward error correction. Any suitable coding technique may be used, for example, Reed-Solomon (R-S), Turbo, or low-density parity-check coded (LDPC) coding. Interleaver 38 rearranges the codewords or portions of the codewords in any suitable manner. As an example, interleaver 38 may interleave bits, symbols, or codewords, which may improve error correction. Signal spreader 42 spreads the signal according to any suitable spectrum spreading technique. As an example, signal spreader 42 maps symbols with spreading codes to spread the signal.

Modulator 46 modulates the output signal. As an example, modulator 46 may equalize the symbols to compensate for channel distortion. As another example, modulator 46 may filter the symbols to yield a specific bandwidth. As another example, modulator 46 may generate bursts of specific smaller bandwidths comprising the larger bandwidth signal. Modulator 46 may use any suitable modulation technique, such as an orthogonal frequency division multiplexing (OFDM) technique. Any suitable modulation may be performed on each tone, for example, differential binary phase shift keying (DBPSK), quadrature amplitude modulation (QAM), or phase shift keying (PSK). Modulator 46 may use any suitable access technique, such as Code Division Multiple Access (CDMA), Time Division Multiple Access (TDMA), Frequency Division Multiple Access (FDMA), or Frequency Hopped Multiple Access (FHMA).

Modifications, additions, or omissions may be made to transmitter 30 without departing from the scope of the invention. The components of transmitter 30 may be integrated or separated according to particular needs. Moreover, the operations of transmitter 30 may be performed by more, fewer, or other modules. For example, the operations of interleaver 38 and signal spreader 42 may be performed by one module, or the operations of signal spreader 42 may be performed by more than one module. Additionally, operations of transmitter 30 may be performed using any suitable logic.

FIG. 4 is a flowchart illustrating one embodiment of a method for adjusting waveform parameters in response to dynamic spectrum and channel conditions encountered by nodes 20 of FIG. 1. According to the embodiment, transmitting node 20 may send a probe signal to receiving node 20, which may reply with channel estimation information. Transmitting node 20 estimates dynamic spectrum and channel conditions from external spectrum information and the channel estimation information, and adjusts waveform parameters in response to the conditions.

The FIG. 4 method begins at step 100, where a link bearer selection process is initiated between FIG. 1 transmitting node 20 and receiving node 20. A center frequency for the bearer channel is selected at step 104. Transmitting node 20 and receiving node 20 may engage in a bearer negotiation process to establish a bearer channel for the communication session. The bearer negotiation process for each transmitter-receiver pair may be negotiated independently of the negotiations of other pairs.

Nodes 20 may be capable of performing a heteromorphic bearer negotiation process at step 108. A heteromorphic bearer negotiation process may refer to a bearer negotiation process where waveform parameters are adjusted in response to dynamic spectrum and channel conditions. The heteromorphic bearer negotiation may be performed if transmitting node 20 and one, some, or all receiving nodes 20 of the neighborhood are capable of performing the heteromorphic bearer negotiation process. According to one embodiment, a neighbor awareness table of transmitting node 20 may indicate whether a receiver node 20 is capable of performing the heteromorphic bearer negotiation process.

If nodes 20 are not capable of performing the heteromorphic bearer negotiation process at step 108, the method proceeds to step 112, where a conventional bearer negotiation process is performed. The method then proceeds to step 132.

If nodes 20 are capable of performing the heteromorphic bearer negotiation process, the method proceeds to step 116, where transmitting node 20 sends a probe signal to receiving node 20. The probe signal may be sent to optimize the payload bearer channel after the control bearer channel has been established. Transmitting node 20 may also send a spectral mask, which defines the maximum permitted energy in the frequencies surrounding the channel's center frequency.

A reply message that includes channel estimation information is received from receiving node 20 at step 120. The reply message may include results from probe signal processing performed by receiving node 20. The results may include channel estimation information and a local occupancy mask. The channel estimation information may include channel parameters such as a delay spread, a Doppler value, signal to noise ratio (SNR), or coherence time and bandwidth estimates. A local occupancy mask may designate excised spectrum that cannot be used for any number of reasons.

The bearer format is established from the channel estimation information at step 124. A coherent integration block may be generated from the coherent time and coherent bandwidth estimated from the channel parameters. A coherent integration block indicates the dynamics of the channel conditions, and may be used to determine waveform parameter adjustments. A coherent integration block may designate bandwidth over which frequencies of a signal are likely to experience correlated amplitude fading, and the time during which a signal remains coherent. An example coherent integration block is described in more detail with reference to FIG. 5. The bearer format may be generated in accordance with the channel conditions. An example waveform format is described in more detail with reference to FIG. 6.

Waveform parameters may be adjusted to conform to the bearer format at step 126. As an example, the sub-carriers may be organized to select portions of a channel. As another example, a modulation type may be selected, and a power may be set for each sub-carrier. Waveform parameters may be adjusted to provide optimization at step 128. As an example, a processing gain and a block size may be selected. As another example, forward error correction and interleaving techniques may be selected. As another example, a burst length may be selected.

The link bearer is used at step 132. The method may continue to adapt to changing spectrum and link conditions, and may be re-initialized as needed.

Modifications, additions, or omissions may be made to the method without departing from the scope of the invention. The method may include more, fewer, or other steps. Additionally, steps may be performed in any suitable order without departing from the scope of the invention.

Figure 5:
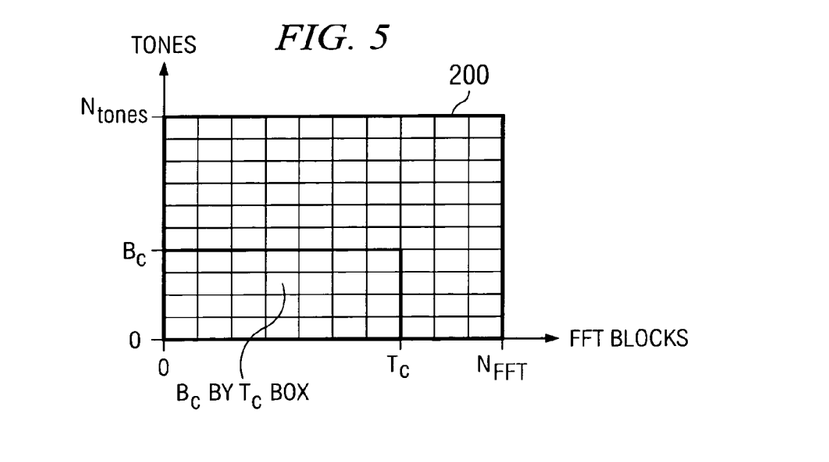
FIG. 5 is a diagram illustrating one example of a coherent integration block.

FIG. 5 is a diagram illustrating one example of a coherent integration block 200. Coherent integration block 200 may be used to designate the bandwidth over which frequencies of a signal are likely to experience correlated amplitude fading, and the time during which a signal remains coherent. Coherent integration block 200 may be generated from channel parameters sent by receiving node 20.

According to one embodiment, the channel parameters include a delay spread D and a Doppler frequency $f_{Dop}$. A coherence time $T_c$ and coherence bandwidth $B_c$ may be estimated in any suitable manner. A coherence bandwidth versus coherence time ($B_c \times T_c$) box may be calculated from the estimated coherence time and coherence bandwidth. A $B_c \times T_c$ box may be expressed in units of tones versus fast Fourier transform (FFT) blocks. The coherence time $T_c$ and coherence bandwidth $B_c$ may be scaled to units of number of tones and FFT integration blocks. A cell of $B_c \times T_c$ box may have any suitable size, such as $0.1N_{tones}$ by $0.1N_{FFT}$. The dimensions of the cells may be rounded to the next integer value.

Modifications, additions, or omissions may be made to coherent integration block 200 without departing from the scope of the invention. For example, coherent integration block 200 may have different units.

Figure 6:
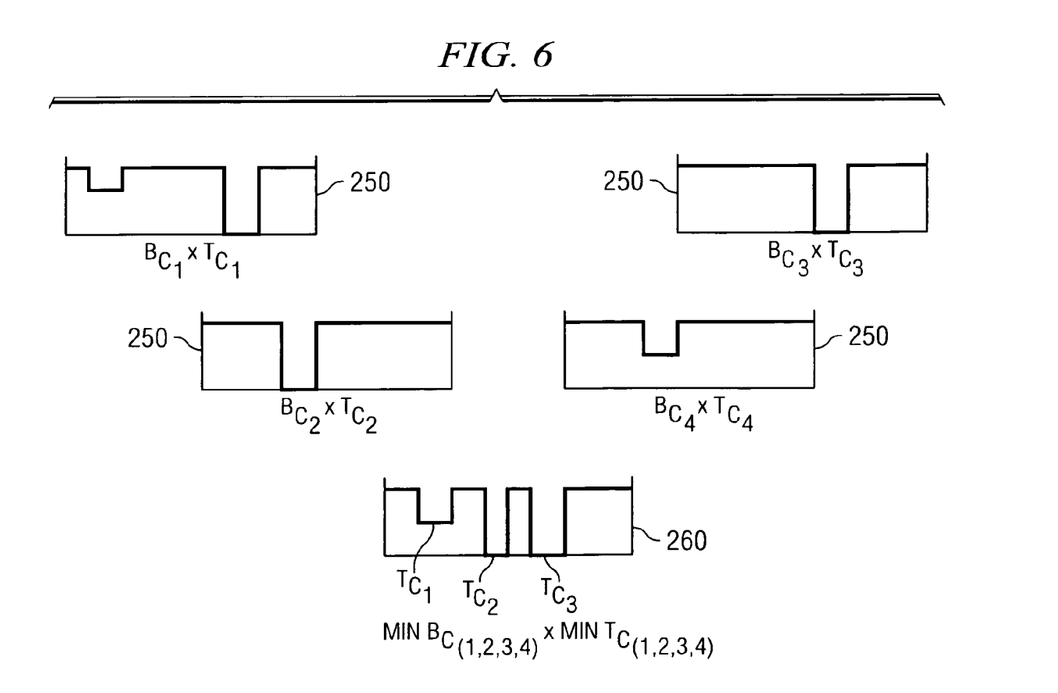
FIG. 6 is a diagram illustrating one embodiment of a method for generating a merged multiple link waveform format from one or more single link waveform formats.

FIG. 6 is a diagram illustrating one embodiment of a method for generating a merged waveform format 260 from one or more received waveform formats 250. A merged waveform format may be generated in accordance with channel conditions. A received waveform format reflects the channel conditions for the channel used by receiving node 20 and transmitting node 20. A merged waveform format is generated from one or more received waveform formats, and designates the waveform format to be used by receiving nodes 20 and transmitting node 20. According to one embodiment, the merged waveform format 260 may be generated from the minimum coherence bandwidth value of the received coherence bandwidth values and from the minimum coherence time values of the received coherence time values.

Transmitting node 20 notifies receiving nodes 20 of the merged waveform format 260. The merged waveform format 260 may be communicated to the receiving node 20 in any suitable manner, for example, in the payload of the probe signal.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that waveform parameters may be adjusted in response to channel conditions. Adjusting the waveform parameters in response to channel conditions may yield a waveform that improves performance and reduces mutual interference with surrounding nodes. Another technical advantage of one embodiment may be that waveform parameters may be adjusted in response to spectrum conditions in addition to channel conditions. Adjusting the waveform parameters in response to spectrum conditions may yield a waveform that improves performance and reduces mutual interference with surrounding nodes.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for adjusting one or more parameters of a waveform, comprising:
   facilitating wireless communication between a transmitting node and one or more receiving nodes, the transmitting node communicating with a receiving node over one or more channels of a plurality of channels;
   determining that the one or more receiving nodes are operable to perform a heteromorphic waveform process by receiving a reply from the one or more receiving nodes indicating ability to adjust one or more waveform parameters, the reply message comprising channel estimation information;
   estimating one or more dynamic spectrum conditions, a spectrum condition describing spectrum utilization in the vicinity of one or more surrounding nodes;
   estimating one or more dynamic channel conditions using the channel estimation information, a channel condition describing a channel of the plurality of channels; and
   adjusting the one or more waveform parameters in response to the one or more spectrum conditions and the one or more channel conditions,
   wherein adjusting the one or more waveform parameters further comprises: embedding the one or more waveform parameters in a transmitted waveform format, wherein at least one waveform parameter is used to decode the signal.

2. The method of claim 1, wherein estimating the one or more spectrum conditions further comprises at least one of:
   estimating one or more available spectrum holes for the transmitting node and a receiving node of the one or more receiving nodes; and
   estimating one or more merged available spectrum holes for the transmitting node and a plurality of receiving nodes of the one or more receiving nodes.

3. The method of claim 1, wherein estimating the one or more spectrum conditions further comprises: estimating one or more available spectrum holes for the transmitting node and a receiving node of the one or more receiving nodes, and estimating one or more merged available spectrum holes for the transmitting node and a plurality of receiving nodes of the one or more receiving nodes.

4. The method of claim 1, wherein estimating the one or more channel conditions further comprises:
   sending a probe signal from the transmitting node to a receiving node of the one or more receiving nodes over a channel;
   receiving the reply message comprising channel estimation information for the channel; and
   estimating a channel condition for the channel from the channel estimation information.

5. The method of claim 1, wherein estimating the one or more channel conditions further comprises:
   estimating a coherence bandwidth for a channel; estimating a coherence time for the channel; and
   estimating a channel condition for the channel from the coherence bandwidth and the coherence time.

6. The method of claim 1, wherein estimating the one or more channel conditions further comprises:
   estimating a coherence bandwidth for a channel;
   estimating a coherence time for the channel;

generating a coherent integration block from the coherence bandwidth and the coherence time, the coherent integration block describing the bandwidth over which a plurality of frequencies of a signal are likely to experience correlated amplitude fading, the coherent integration block describing the time during which the signal remains coherent; and estimating a channel condition for the channel from the coherent integration block.

7. The method of claim 1, wherein adjusting the one or more waveform parameters further comprises: establishing one or more transmitted waveform formats, a transmitted waveform format derived from a channel condition.

8. The method of claim 1, wherein adjusting the one or more waveform parameters further comprises:
establishing one or more transmitted waveform formats, a transmitted waveform format derived from a channel condition; and
generating a merged waveform format from the one or more transmitted waveform formats, the merged waveform format designating a waveform format for communication.

9. The method of claim 1, wherein adjusting the one or more waveform parameters further comprises: establishing one or more transmitted waveform formats, a transmitted waveform format derived from a spectrum condition.

10. The method of claim 1, wherein adjusting the one or more waveform parameters further comprises:
establishing one or more transmitted waveform formats, a transmitted waveform format derived from a spectrum condition; and
generating a merged waveform format from the one or more transmitted waveform formats, the merged waveform format designating a waveform format for communication.

11. The method of claim 1, wherein adjusting the one or more waveform parameters further comprises: establishing one or more transmitted waveform formats, a transmitted waveform format derived from a channel condition and a spectrum condition.

12. The method of claim 1, wherein adjusting the one or more waveform parameters further comprises:
establishing one or more transmitted waveform formats, a transmitted waveform format derived from a channel condition and a spectrum condition; and
generating a merged waveform format from the one or more transmitted waveform formats, the merged waveform format designating a waveform format for communication.

13. The method of claim 1, wherein adjusting the one or more waveform parameters further comprises: forming a spectral occupancy mask, the spectral occupancy mask determining how a signal utilizes a spectrum.

14. The method of claim 1, wherein adjusting the one or more waveform parameters further comprises: adjusting a coding parameter, a coding parameter describing coding of a signal.

15. A transmitting node operable to adjust one or more parameters of a waveform, comprising:
an interface operable to:
facilitate wireless communication with one or more receiving nodes, the interface operable to communicate with a receiving node over one or more channels of a plurality of channels; and
a processor coupled to the interface and operable to:
determine that the one or more receiving nodes are operable to perform a heteromorphic waveform process by receiving a reply from the one or more receiving nodes indicating ability to adjust one or more waveform parameters, the reply message comprising channel estimation information;
estimate one or more dynamic spectrum conditions, a spectrum condition describing spectrum utilization in the vicinity of one or more surrounding nodes;
estimate one or more dynamic channel conditions using the channel estimation information, a channel condition describing a channel of the plurality of channels; and
adjust the one or more waveform parameters in response to the one or more spectrum conditions and the one or more channel conditions by embedding the one or more waveform parameters in a transmitted waveform format, wherein at least one waveform parameter is used to decode the signal.

16. The node of claim 15, the processor further operable to estimate the one or more spectrum conditions by:
estimating one or more available spectrum holes for the transmitting node and a receiving node of the one or more receiving nodes; and
estimating one or more merged available spectrum holes for the transmitting node and a plurality of receiving nodes of the one or more receiving nodes.

17. The node of claim 15, the processor further operable to estimate the one or more channel conditions by:
sending a probe signal from the transmitting node to a receiving node of the one or more receiving nodes over a channel;
receiving the reply message comprising channel estimation information for the channel; and
estimating a channel condition for the channel from the channel estimation information.

18. The node of claim 15, the processor further operable to estimate the one or more channel conditions by:
estimating a coherence bandwidth for a channel;
estimating a coherence time for the channel; and
estimating a channel condition for the channel from the coherence bandwidth and the coherence time.

19. The node of claim 15, the processor further operable to estimate the one or more channel conditions by:
estimating a coherence bandwidth for a channel;
estimating a coherence time for the channel;
generating a coherent integration block from the coherence bandwidth and the coherence time, the coherent integration block describing the bandwidth over which a plurality of frequencies of a signal are likely to experience correlated amplitude fading, the coherent integration block describing the time during which the signal remains coherent; and
estimating a channel condition for the channel from the coherent integration block.

20. The node of claim 15, the processor further operable to estimate the one or more channel conditions by:
estimating a coherence bandwidth for a channel of the plurality of channels;
estimating a coherence time for the channel;
generating a coherent integration block from the coherence bandwidth and the coherence time, the coherent integration block describing bandwidth over which a plurality of frequencies of a signal are likely to experience correlated amplitude fading, the coherent integration block describing the time during which the signal remains coherent;
estimating a channel condition for the channel from the coherent integration block; and defining a transmitter waveform format for the transmitting node and a receiving node of the one or more receiving nodes.

21. The node of claim 15, the processor further operable to estimate the one or more channel conditions by:
   estimating a coherence bandwidth for a channel of the plurality of channels;
   estimating a coherence time for the channel;
   generating a coherent integration block from the coherence bandwidth and the coherence time, the coherent integration block describing bandwidth over which a plurality of frequencies of a signal are likely to experience correlated amplitude fading, the coherent integration block describing the time during which the signal remains coherent; and
   estimating a channel condition for the channel from the coherent integration block; and
   defining one or more transmitter waveform formats, a transmitter waveform format being for the transmitting node and a receiving node of the one or more receiving nodes; and
   defining a merged waveform format from the one or more transmitter waveform formats.

22. The node of claim 15, the processor further operable to: determine that the one or more receiving nodes are operable to perform a heteromorphic waveform process.

23. The node of claim 15, the processor further operable to adjust the one or more waveform parameters by: adjusting a spectral occupancy mask, the spectral occupancy mask determining how a signal utilizes spectrum.

24. The node of claim 15, the processor further operable to adjust the one or more waveform parameters by: adjusting a coding parameter, a coding parameter describing coding of a signal.

25. The node of claim 15, the processor further operable to adjust the one or more waveform parameters by:
   adjusting a coding parameter, the coding parameter describing coding of a signal.

26. A system for adjusting one or more waveform parameters of a waveform, comprising:
   means for facilitating wireless communication between a transmitting node and one or more receiving nodes, the transmitting node communicating with a receiving node over one or more channels of a plurality of channels;
   means for determining that the one or more receiving nodes are operable to perform a heteromorphic waveform process by receiving a reply from the one or more receiving nodes indicating ability to adjust one or more waveform parameters, the reply message comprising channel estimation information;
   means for estimating one or more dynamic spectrum conditions, a spectrum condition describing spectrum utilization by one or more surrounding nodes;
   means for estimating one or more dynamic channel conditions using the channel estimation information, a channel condition describing a channel; and
   means for adjusting the one or more waveform parameters in response to the one or more spectrum conditions and the one or more channel conditions,
wherein the means for adjusting the one or more waveform parameters further comprises means for embedding the one or more waveform parameters in a transmitted waveform format, wherein at least one waveform parameter is used to decode the signal.

27. A method for adjusting one or more waveform parameters of a waveform, comprising:
   facilitating wireless communication between a transmitting node and one or more receiving nodes, the transmitting node communicating with a receiving node over one or more channels of a plurality of channels;
   determining that the one or more receiving nodes are operable to perform a heteromorphic waveform process by receiving a reply from the one or more receiving nodes indicating ability to adjust one or more waveform parameters, the reply message comprising channel estimation information;
   estimating one or more dynamic spectrum conditions, a spectrum condition describing spectrum utilization by one or more surrounding nodes;
   estimating one or more dynamic channel conditions using the channel estimation information, a channel condition describing a channel of the plurality of channels, estimating the one or more channel conditions further comprising:
      sending a probe signal from the transmitting node to a receiving node of the one or more receiving nodes over a channel;
      receiving a reply message comprising channel estimation information for the channel;
      estimating a channel condition for the channel from the channel estimation information;
      estimating a coherence bandwidth for the channel;
      estimating a coherence time for the channel;
      generating a coherent integration block from the coherence bandwidth and the coherence time, the coherent integration block describing the bandwidth over which a plurality of frequencies of a signal are likely to experience correlated amplitude fading, the coherent integration block describing the time during which the signal remains coherent;
      estimating a channel condition for the channel from the coherent integration block;
      estimating one or more received waveform formats, a received waveform format describing a channel condition;
      determining a minimum integration block size of the one or more received waveform formats; and
      generating a merged waveform format from the minimum bandwidth value and the minimum time value, the merged waveform format designating a waveform format for communication; and
   adjusting the one or more waveform parameters in response to the one or more spectrum conditions and the one or more channel conditions, adjusting the one or more waveform parameters further comprising:
      adjusting a spectral occupancy mask, a spectral occupancy mask determining how a signal utilizes a spectrum; and
      adjusting a coding parameter, a coding parameter describing coding of a signal.

* * * * *